United States Patent

[11] 3,612,994

| [72] | Inventor | Lennard Hooper<br>Newport, England |
|------|----------|-----------------------------------|
| [21] | Appl. No. | 859,422 |
| [22] | Filed | Sept. 19, 1969 |
| [45] | Patented | Oct. 12, 1971 |
| [73] | Assignee | International Standard Electric Corporation<br>New York, N.Y. |
| [32] | Priority | Sept. 20, 1968 |
| [33] | | Great Britain |
| [31] | | 44727/68 |

[54] CABLE INSULATION TESTER HAVING A LIQUID IMMERSED ANNULAR ELECTRODE
6 Claims, 4 Drawing Figs.

[52] U.S. Cl. .................................................. 324/54
[51] Int. Cl. .................................................. G01r 31/12
[50] Field of Search .......................................... 324/54

[56] References Cited
UNITED STATES PATENTS

| 2,453,313 | 11/1948 | Gordon ......................... | 324/54 X |
| 2,794,169 | 5/1957 | Gooding ........................ | 324/54 |
| 2,882,491 | 4/1959 | Gooding ........................ | 324/54 |
| 2,894,204 | 7/1959 | Gambrill ....................... | 324/54 |
| 3,465,242 | 9/1969 | Gruetzmacher et al. ..... | 324/54 |

*Primary Examiner*—Gerard R. Strecker
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: Faults in cable insulation are detected by passing the cable through an annular electrode immersed in water. Relatively low voltage is applied between the electrode and the grounded core conductor of the cable. A fault in the insulation completes a discharge path through the water to ground to trigger an indicating circuit.

PATENTED OCT 12 1971　3,612,994

Inventor
LENNARD HOOPER

By Edward Goldberg
Attorney

CABLE INSULATION TESTER HAVING A LIQUID IMMERSED ANNULAR ELECTRODE

BACKGROUND OF THE INVENTION

1. Field of the Invention

This invention relates to electric cable spark testers for the detection of pinhole faults in the plastics insulation of the cable core, and in particular to low-voltage spark testers.

2. Brief Description of the Prior Art

Known forms of spark testers employ high voltages and have certain other disadvantages. The contacting brush-type of tester has phosphor bronze filaments mounted around a ring with the filaments pointing to the center of the ring. These filaments are of such a length as to touch the cable insulation when a cable is passed through the ring. The disadvantage of this type of tester is that the brushes may strip the insulation from the cable. The noncontacting brush type of tester has filaments as before but of such a length as not to touch the cable. The disadvantage here is that the cable must be accurately centered between the brushes or false discharges may occur. The contacting brush tester employs DC voltages of the order of 6 to 8 kv., and the noncontacting brush tester employs DC voltages of the order of 8 to 10 kv.

SUMMARY OF THE INVENTION

It is the object of the invention to provide a spark tester which employs low DC voltages, of the order of 50 to 600 v., and which does not suffer from the aforementioned disadvantages.

According to the invention there is provided a low-voltage spark tester for detecting pinhole faults in the plastics insulation of electric cables. An elongated insulating tube has an earthed guard ring at each end and an inner annular electrode at its center which is connected to a constant voltage DC supply. The portion of the tube containing the electrode is surrounded by a nonmetallic shield. The tube assembly is surrounded by and filled with the cooling water associated with a machine extruding the plastics insulation over a cable conductor, the conductor being taken to earth at the machine. The insulated cable is passed through the tube assembly so that any pinhole causes the electrode to discharge to earth down the cable conductor via the cooling water, with the discharge being indicated and/or recorded by an associated electrical circuit. Embodiments of the invention will now be described with reference to the drawings accompanying the specification:

DESCRIPTION OF THE PREFERRED EMBODIMENTS

Figure 1:
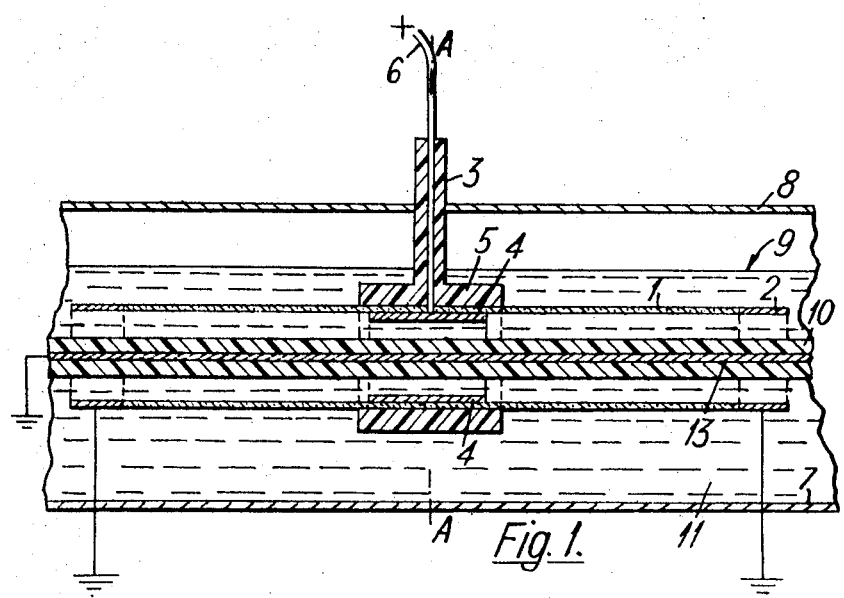
FIG. 1 shows a side view of the apparatus in cross section with the testing circuit omitted.
Figure 2:
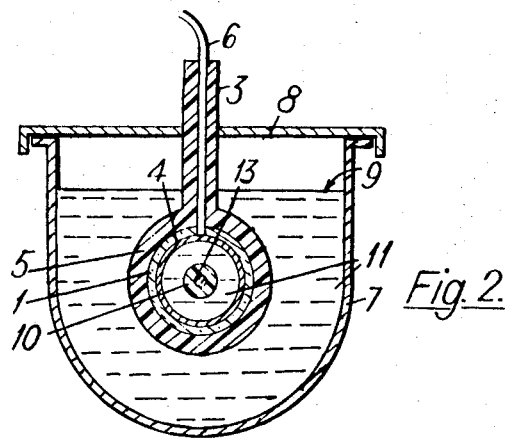
FIG. 2 shows a cross-sectional view of the apparatus taken along the line AA of FIG. 1.

The apparatus, referring to FIG. 1, consists of a long insulating tube 1 having an annular electrode 4 inside it at its center and earthed guard rings 2 at each end. These guard rings prevent the operator receiving an electric shock. The portion of the tube 1 containing the electrode 4 is surrounded by a nonmetallic shield 5 having an arm 3 through which passes lead 6, connecting the voltage supply to the electrode 4. This tube assembly is placed within the trough 7 which contains the water which cools the plastics insulation 10 extruded over conductor 13. The trough 7 is covered by a lid 8, the level of the water being as shown at 9. The cable, having insulation 10, is fed into the cooling trough 7 from the extruding machine (not shown) and threaded through tube 1 which is filled with the cooling water. This is shown in cross section in FIG. 2, the cooling water being represented by numeral 11.

Figure 3:
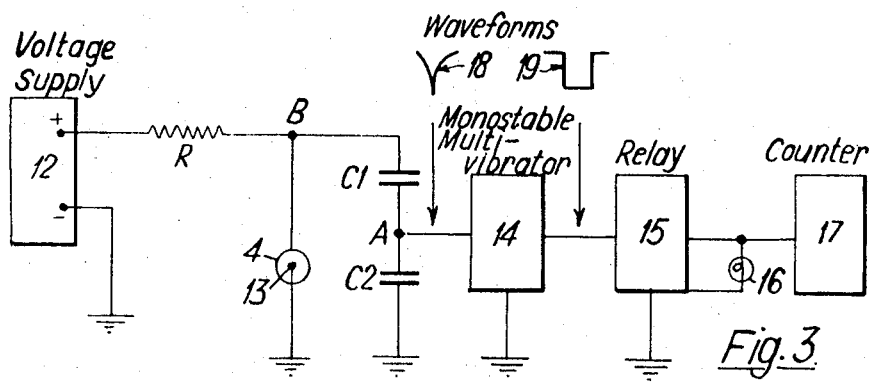
FIG. 3 shows a schematic diagram of one form of testing circuit.

The first form of testing circuit, shown schematically in FIG. 3, comprises a voltage supply 12, capable of supplying constant DC voltages in the range 50 to 600 v., which is earthed at its negative terminal and has its positive terminal connected via a 150 k.ohm resistor R to the electrode 4 and also to an AC potential divider having capacitors C1 and C2. The cable core 13 is taken to a ground or earth potential by means on the extruding machine before the insulation 10 is applied.

Under normal conditions, that is when the cable insulation 10 is fault free, the common point A of the potential divider is at zero volts and the monostable multivibrator 14 is not triggered. When there is a fault in the insulation 10 the electrode 4 discharges to earth down the cable core 13 via the cooling water 11. The potential at point B then falls to zero and the capacitors C1 and C2 discharge to earth causing a spike signal 18 to be fed into monostable 14. This spike signal 18 triggers the monostable 14 which has an output of a 3 msec pulse 19, which operates relay 15 which in turn operates the fault indicator lamp 16 and causes the fault to be counted on the electromagnetic counter 17.

Figure 4:
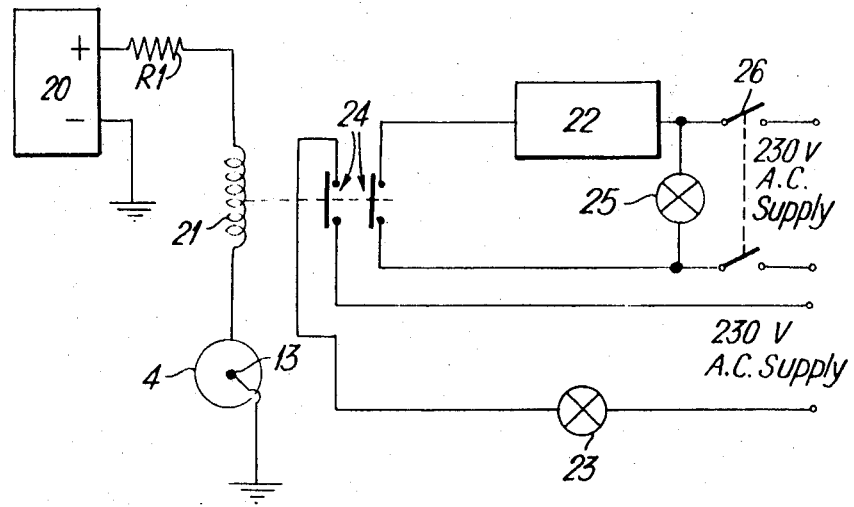
FIG. 4 shows a schematic diagram of a second form of testing circuit.

The second form of testing circuit, shown schematically, in FIG. 4, comprises a voltage source 20, capable of supplying constant DC voltages in the range 50 to 600 v, which is earthed at its negative terminal and has its positive terminal connected to the electrode 4 via a resistor R1 and a relay 21. The cable core 13 is taken to earth potential by means on the extruding machine before the insulation 10 is applied.

Under normal conditions, that is when the cable insulation 10 is fault free, the circuit is incomplete with no connection made between the voltage applied to the electrode 4 and the cable core 13. When there is a fault in the insulation 10, the electrode 4 discharges to earth down the cable core 13 via the cooling water 11. Current flows through the relay 21, energizing it and causing a counter 22 to be tripped and the fault indicated by a lamp 23 via contact 24 of the relay 21.

In a preferred embodiment the insulating tube 1 is made of glass, the nonmetallic shield 5, having arm 3, is made of epoxy resin, and the second form of testing circuit is used with 450 v from DC supply 20. The circuit includes a resistor R1 to 5 k.ohm, a relay 21 of ohmic value 6.5 k.ohm, 230 volts AC supplied to the counter 22 and lamp 23, a power supply "on" lamp 25, and an on/off switch 26.

I claim:

1. A low-voltage spark tester for detecting pinhold faults in the plastics insulation of electric cables comprising an elongated insulating tube, an annular electrode enclosed within a portion of the tube, a source of constant direct voltage connected through said tube to said electrode and connected to a ground potential, an insulating shield surrounding the portion of the tube enclosing the electrode, a container of water, the tube assembly being positioned within the container and filled with the water, an insulated cable disposed within the tube assembly and having an inner conductor connected to said ground potential, any pinhole in said cable insulator causing the electrode to discharge to ground via the cooling water and conductor, and circuit means for indicating said discharge, said circuit means including two capacitors connected in series, one terminal of one capacitor being connected to ground, another terminal of the other capacitor being connected to said constant direct voltage source and to said annular electrode, trigger means for providing an output pulse, a center point between the capacitors being connected to said trigger means which is adapted to be triggered upon the occurrence of said electrode discharge to provide said output pulse, control means energized by said pulse and indicator means energized by said control means to indicate said discharge.

2. A low-voltage spark tester as claimed in claim 1 wherein the trigger means comprises a monostable multivibrator, said control means is a relay and said indicator means includes a fault indicator lamp energized by said relay and recording means for recording the discharge.

3. A low-voltage spark tester as claimed in claim 1 wherein the insulating tube is made of glass.

4. A low-voltage spark tester as claimed in claim 1 wherein the insulating shield is made of an epoxy resin.

5. A low-voltage spark tester as claimed in claim 1 wherein the constant direct voltage source provides constant voltages in the range of 50 to 600 volts.

6. A low-voltage spark tester as claimed in claim 1 wherein said insulating tube includes grounded guard rings at each end thereof.